United States Patent [19]
Davignon et al.

[11] Patent Number: 4,505,487
[45] Date of Patent: Mar. 19, 1985

[54] DEAD STOP FOR COLLET CHUCKS

[75] Inventors: Paul A. Davignon, Uxbridge; Michael G. Duclos, Ashland, both of Mass.

[73] Assignee: American Optical Corporation, Southbridge, Mass.

[21] Appl. No.: 349,104

[22] Filed: Feb. 16, 1982

[51] Int. Cl.³ .............................................. B23B 31/20
[52] U.S. Cl. .................................. 279/1 S; 279/46 R
[58] Field of Search ................... 279/1 S, 46; 82/34 C

[56] References Cited

U.S. PATENT DOCUMENTS

| | | | |
|---|---|---|---|
| 2,469,160 | 5/1949 | Evans | 279/1 S |
| 2,502,719 | 4/1950 | Haley et al. | 279/46 |
| 2,871,023 | 1/1959 | McCormick | 279/1 S |
| 2,965,381 | 12/1960 | Meyer | 279/1 S |
| 3,599,997 | 8/1971 | Oliver | 279/1 S |

Primary Examiner—William R. Briggs
Assistant Examiner—Daniel W. Howell
Attorney, Agent, or Firm—Anthony M. Lorusso

[57] ABSTRACT

A dead stop for workpiece positioning in collet chucking machinery. A fixed length stop is provided within a machine collet for establishing workpiece position independently of the collet clamping function and workpiece diameter.

5 Claims, 3 Drawing Figures

DEAD STOP FOR COLLET CHUCKS

BACKGROUND OF THE INVENTION

1. Field of the Invention

This invention relates to workpiece chucking apparatus and has particular reference to improvements in collet chucks.

2. Discussion of the Prior Art

Inherent in workpiece chucking with machine collets is pull back of the collets with workpiece clamping, i.e. collet closing. The amount of collet pullback being related to the difference between open collet diameter and workpiece diameter accordingly requires consistency of workpiece diameter for consistency of workpiece displacement and compensation for workpiece displacement in machining operations such as facing, side finishing and/or cutting to precise lengths.

In view of prior art workpiece stops being generally ungainly and complex in structure as well as costly and/or tedious to adjust or otherwise operate, it is a principal object of this invention to provide an improved workpiece dead stop for collet chucks.

More particularly, there is the objective of providing a collet chuck dead stop which is adapted to function independently of collet closing pullback.

Still another object is to accomplish the above with dead stop means of simple construction and which is universally adaptable to collets of various sizes, readily adjustable for dead stop positioning and reliable in repeated operation.

Other objects and advantages of the invention will become apparent from the following description.

SUMMARY OF THE INVENTION

The above and corollary objectives are accomplished with stop means constructed and arranged to be fixed at preselected depths within a hollow machine spindle. A collet of selected work clamping size is extended over the stop for independent sliding movement in the machine spindle whereby drawback for closure around a workpiece can be accomplished without displacement of the workpiece.

Fixing the stop within the machine spindle is accomplished with fins extending laterally through the usual slotting of a selected collet. The fins are wedged apart by operation of a set screw for fixing of the stop.

Details of the invention will become apparent from the following description when taken in conjunction with the accompanying drawings in which.

DESCRIPTION OF THE PREFERRED EMBODIMENTS

Figure 1:
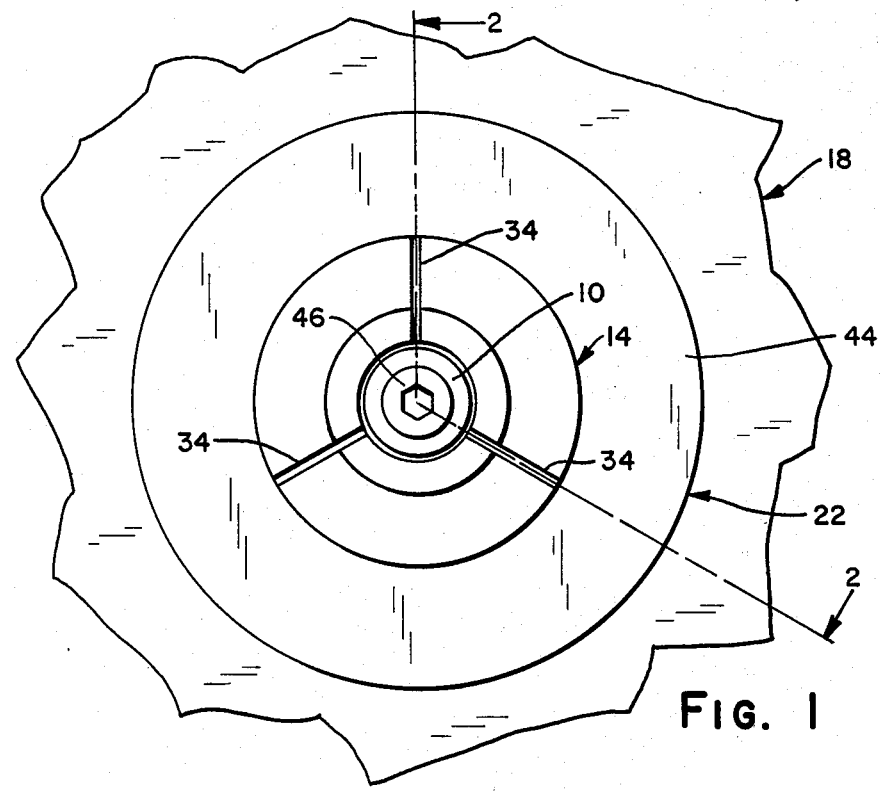
FIG. 1 is a front elevational view of a machine collet chuck embodying the invention.

Referring to the drawings, face 10 of dead stop 12 within collet chuck 14 locates a workpiece 16 in machine 18 for working thereof in conventional fashion, e.g. with a lathe tool, drill, grinder or other special tooling.

Collet chuck 14 clamps the prelocated workpiece in the usual manner, i.e. by pullback in machine spindle 22 against internal taper 24. Internally threaded collet tightening rod 26 performs this function, i.e. by rotation in spindle 22.

Figure 3:
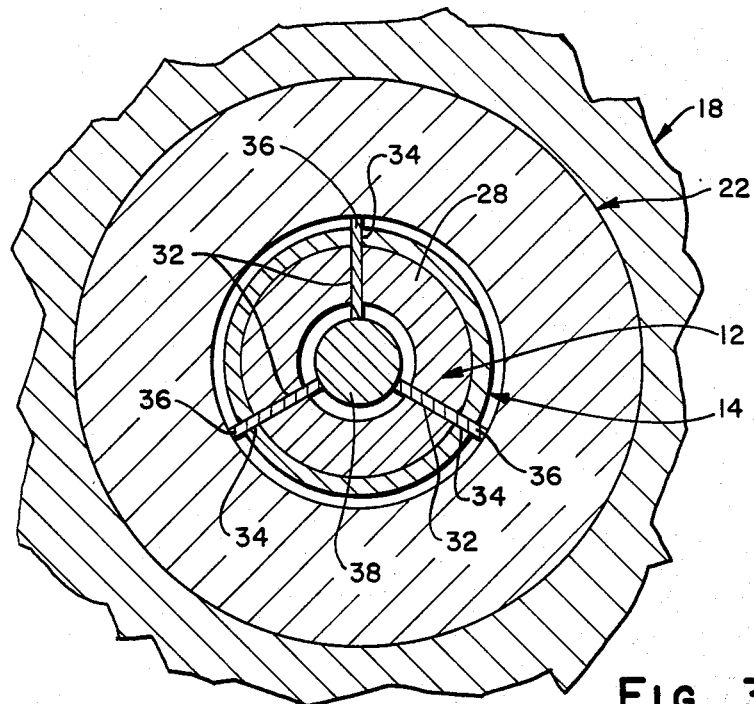
FIG. 3 is another cross-sectional view taken approximately at the position of line 3—3 in FIG. 2, looking in the direction of the arrows.
Figure 2:
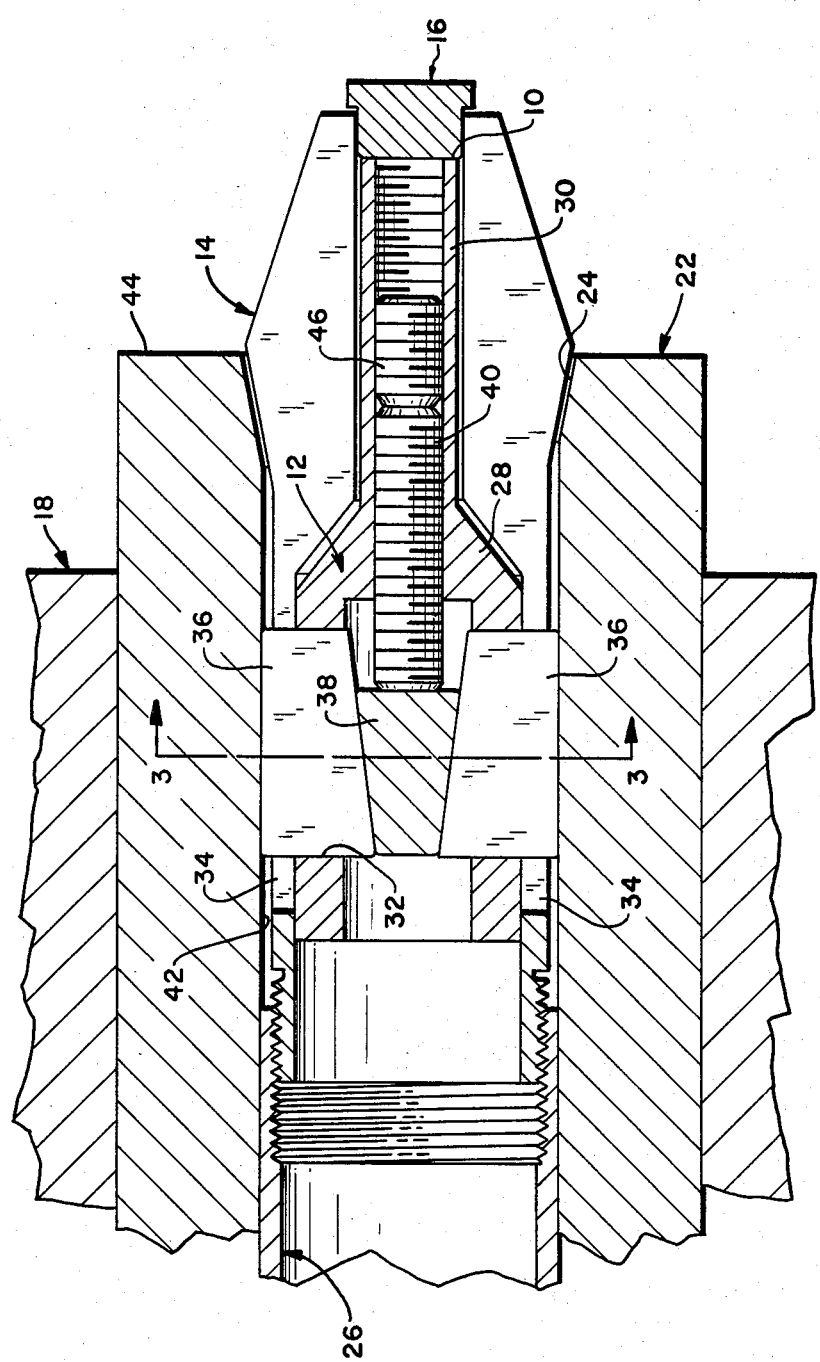
FIG. 2 is a cross-sectional view of the collet chuck taken generally along line 2—2 of FIG. 1.

Referring more specifically to details of dead stop 12, it can be seen in FIGS. 2 and 3 that it comprises main body 28 having neck 30, the latter extending into the work clamping end of collet chuck 14 for location of face 10 therein as shown.

Oppositely of neck 30, main body 28 is provided with radial slots 32 in positions corresponding to collet chuck slots 34. Extending through corresponding pairs of slots 32 and 34 are dead stop locking fins 36 supports by wedge 38 which, in turn, is operated by set screw 40.

With wedge 38 retracted somewhat in body 28, i.e. enough to free fins 36 from contact with inner surface 42 of spindle 22, sliding adjustment of dead stop unit 12 in spindle 22 is permitted. Thus, face 10 may be brought to a desired position for locating workpieces 16 as desired relative to the end 44 of spindle 22 or relative to any other selected part, e.g. a working tool, of machine 18.

With proper positioning of face 10 of dead stop 12, wedge 38 is driven against fins 36 by actuation of set screw 40 until firm locking of fins 36 against inner surface 42 of spindle 22 fixes dead stop 12 for use.

Collet chuck 14, now extending over the fin locked dead stop, is free to close over a workpiece 16 placed against face 10 by being drawn back into spindle 22 with rod 26. During this operation, workpiece 16 remains fixed. It does not drawback with the collet chuck.

Repeated chucking and releasing of similarly located workpieces is, accordingly, possible with precision of workpiece position at each time.

Workpiece release merely requires the usual movement of collet 14 toward end 44 of spindle 22.

Optional locking screw 46 is illustrated in FIG. 2. When used, this screw locks set screw 40 against accidental displacement from the above-mentioned setting which holds fins 36 tightly against spindle surface 42.

The invention has a special adaptability to lathes of conventional construction. Such lathes need no detailed description or illustration herein beyond that incorporated above. Details of lathe heads, collet receiving spindles, ways, tailstocks, tool supports and tools as well as other components not illustrated in this disclosure would be well-known and readily understood by the artisan. Also, it should be understood that various modifications and adaptations of the precise form of the invention herein described may be made to suit particular requirements and it is intended that all modifications which incorporate the novel concept disclosed are to be construed as coming within the scope of the following claims or range of equivalency to which they are entitled.

We claim:

1. A workpiece dead stop for collect chucks comprising:

a main body having hollow elongated neck portion extendable into the work-receiving end of a conventional multiply longitudinally slotted collet chuck, the terminus of said neck providing a precision stop for workpieces inserted into said work-receiving end of said collet chuck;

said main body of said dead stop further including a plurality of radially adjustable fin members each adapted to extend laterally through a one of said slots of said collet chuck; and means within the elongated neck portion for selectively moving said fin members radially outwardly through said collet chuck slots for locking said dead stop against an inner wall of hollow machine spindle when said dead stop and collet chuck are assembled and positioned in said spindle, said collet chuck remaining free for selective closing of said work-receiving end by pullback in said spindle.

2. A workpiece dead stop according to claim 1 including wedge means within said dead stop main body for use in effecting said outward movement of said fin members.

3. A workpiece dead stop according to claim 2 further including a first screw threaded in said neck portion of said dead stop main body for selectively adjusting the position of said wedge means in said main body.

4. A workpiece dead stop according to claim 3 wherein said first screw and wedge means are unitary.

5. A workpiece dead stop according to claim 3 including a second screw threaded in said neck portion of said dead stop for threading away from and against said first screw to respectively release and lock said first screw, the former action permitting adjustment of said wedge with said first screw and the latter action avoiding accidental wedge displacement from a given position of adjustment.

* * * * *